Dec. 31, 1935.  R. L. TEMPLIN ET AL  2,025,789
SUPPORT
Filed Aug. 5, 1931
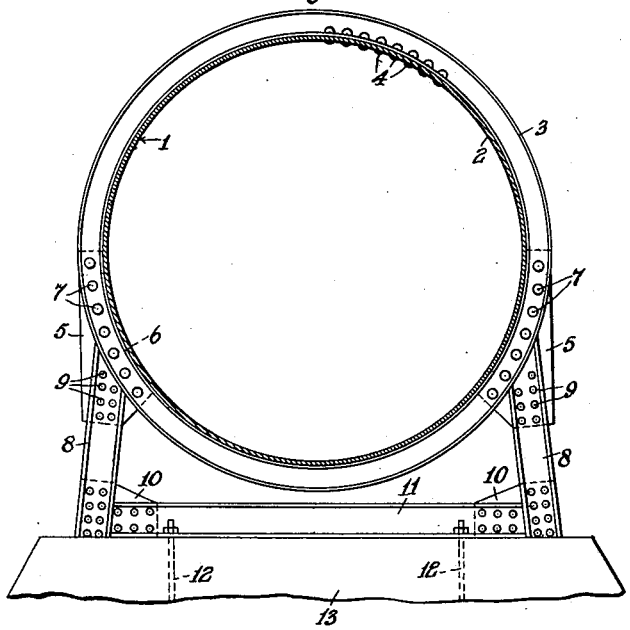
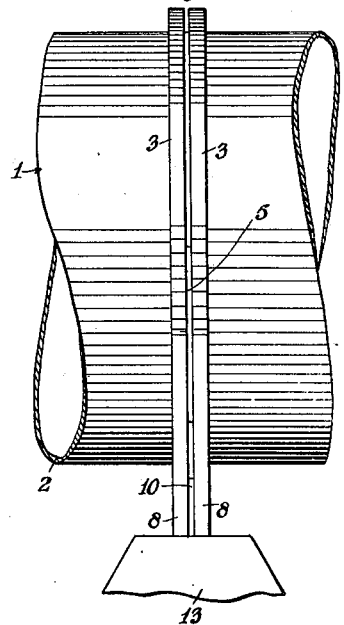
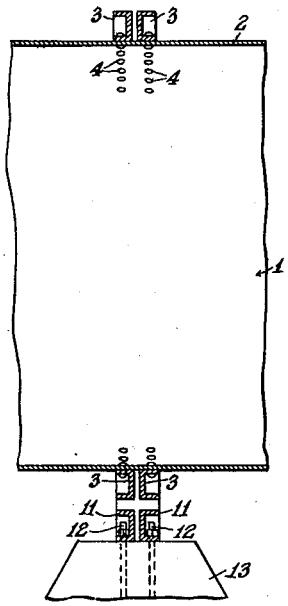
RICHARD L. TEMPLIN AND
ROLLAND G. STURM
INVENTORS
BY Wm. S. Pritchard.
ATTORNEY Patented Dec. 31, 1935

2,025,789

UNITED STATES PATENT OFFICE 2,025,789

SUPPORT

Richard L. Templin, New Kensington, and Rolland G. Sturm, Arnold, Pa., assignors to Aluminum Company of America, Pittsburgh, Pa., a corporation of Pennsylvania Application August 5, 1931, Serial No. 555,230

9 Claims. (Cl. 138—69)

This invention relates to supports and more particularly to a pipe support which is adapted to successfully resist and withstand the forces acting on the pipe during the actual use thereof.

In the hydraulic engineering field, large diameter pipes or penstocks supported at spaced intervals are utilized to conduct water from any suitable source of supply, such as a dam, to a plant, such as a power plant, wherein the water is utilized. These pipes are constructed of relatively thin steel plates, for example, ¾ inch plates, and are of relatively large diameter such as, for instance, 20 feet more or less in diameter. Because of the large diameter and the thinness of the shell, these structures are commonly known and called "flexible pipe lines". They are usually provided at predetermined closely spaced intervals with stiffening rings made of standard structural sections.

In a pipe line of the type to which this invention relates, the design must be such as to take care of the various stresses which are or may be present. For example, the design must take into consideration the stresses acting on the pipe due to the circumferential moment caused by the weight of the structure, the weight of the contained liquid and the supporting reactions. It must also provide for an occasional stress which may be induced in the pipe by an excessive outside over inside pressure, such as is caused by the sudden escape of a contained fluid from an unvalved container. This latter type of stress is entirely independent of the type of support but must be resisted by the reinforcing rings. The design of these pipes is extremely difficult from a mathematical standpoint. Very frequently, a design determined by purely mathematical analysis does not check with the actual conditions found in construction. The reinforcing rings intermediate the supports are spaced by empirical formulas which have in general proved satisfactory, but the design of an efficient and effective support for these pipe lines has given the greatest trouble and difficulty.

The general procedure in constructing these large pipe lines has been to build the line with a large factor of safety in accordance with a design determined by mathematical calculations based on the assumption that the maximum stresses encountered were entirely dependent upon the hydrostatic pressure in the pipe line during operation, little or no attention being paid to the stresses set up in the pipe shell and stiffening rings by the circumferential bending moment causing deformation over the supports. The intensity and position of these high localized stresses vary with the degree of fullness of the pipe for any given support and the intensity decreases as an hydrostatic pressure is encountered in the pipe, due to the tendency of this pressure to maintain the true circular cross section of the pipe. If failure occurred when the line was in operation, the pipe was reinforced in the field by the addition of a metal plate around the periphery of the pipe at the point of support.

The majority of these pipe lines prior to this invention were supported on the lower portion of the periphery by means of a saddle. The support afforded the pipe by the saddle was dependent on the arc of contact with the pipe. Usually, the saddle engaged the periphery through a small arc of contact, and under operating conditions, particularly when it encountered the maximum bending stresses which are obtained when the pipe is nearly filled, the pipe was deformed so that it was distorted from its initial circular shape. The portion of the periphery of the pipe which was in contact with the saddle, however, retained its original curvature and it appeared as a depression in the deformed pipe.

Deformation could be substantially decreased by making the arc of contact between the saddle and pipe to extend over approximately 180° of the pipe. While this type of support is mathematically effective it has certain disadvantages. It is large and expensive, and it was found that when such supports were built they did not give the results predicted by the mathematical conclusions. The disparity was found to be due to the fact that it was impossible to construct a saddle support which would conform exactly to the periphery of the pipe.

It has now been found that when a support designed to maintain the pipe in equilibrium and preferably possessing sufficient flexibility, whereby it will automatically adjust itself to the varying bending moments, is disposed at predetermined spaced intervals adjacent the pipe at points of maximum bending moments at the maximum loading conditions, a very effective, simple and inexpensive pipe support is obtained.

It is therefore an object of this invention to provide a pipe line having a plurality of supports at predetermined spaced intervals along the path of the pipe, each of said supports exerting a force resisting the bending moments tending to deform the pipe and being disposed at points where the pipe encounters the maximum bending moment in use, each of said supports also possessing sufficient flexibility to automatically adjust itself to the different moments produced by the changes in level of the water or other fluid within the pipe.

Other objects will appear from the following description, appended claims and accompanying drawing forming part of this specification and wherein:

Figure 1 is a front elevation of a pipe supported by the support constituting this invention.

Figure 2 is a side elevation of the structure illustrated in Figure 1.

Figure 3 is a vertical section of the structure illustrated in Figure 1.

In accordance with the principles of this invention, a support, preferably composed of symmetrical members, is disposed at predetermined spaced intervals adjacent the pipe at the points where the maximum bending moment occurs at the maximum loading condition. Since it is essential that the pipe be maintained in equilibrium, the support is so positioned that it will exert the necessary forces therefor and will induce a minimum of stress in the shell in view of the magnitude of the forces encountered under various loading conditions.

To secure a minimum of stress in the shell and stiffener rings at the maximum loading condition it is found that the supporting member should be placed at 17.3° below the horizontal axis of the pipe and have the lines of action of these members inclined toward the vartical axis of the pipe at an angle of 13.3°.

As previously stated, the maximum bending moment is encountered when the pipe is full of fluid and under no hydrostatic pressure, but the bending moments vary as the water level in the pipe changes. With a rigid support this would mean that to obtain the optimum condition it would be necessary to furnish supports, for example, struts, at different places for every level of water. This, of course, is impractical. Therefore, the present invention provides a construction which possesses a sufficient amount of flexibility, whereby the support will automatically adjust itself to the varying bending moments to compensate for the varying moments produced by the changes in water level.

Referring now to the drawing wherein like reference numerals designate like parts, the reference numeral 1 designates a pipe of large diameter, such as, for example, 20 feet more or less, formed with a shell 2 of relatively thin metal, such as, for example, a ¾ inch steel plate. At spaced intervals determined by mathematical conclusions, there are provided reinforcing rings 3 formed of standard structural sections, such as channels, secured to the shell by means of any suitable means, such as, for example, rivets 4.

For reasons previously explained, the support is positioned at opposite points 17.3° below the horizontal axis of the pipe in such a manner that it exerts the necessary forces to maintain the pipe in equilibrium and effectively resist the maximum bending moment at maximum load conditions. With this in view, gussets or plates 5 having arcuately shaped seats 6 are secured between the reinforcing rings 3 by means of rivets 7. At an angle of 13.3° to the vertical, there are provided upwardly extending struts 8 which are secured to the gussets 5 by rivets 9, as indicated. The lower ends of the struts 8 are secured to gussets 10 which are secured between two channels 11 securely anchored by anchoring bolts 12 to a foundation or pier 13 formed of concrete or any other material. The gussets 5 should be of such length as to distribute the reactions of the struts 8 over a length of reinforcing ring 3 equal to about 40° of arc for each gusset and should extend upwardly to the horizontal centerline.

The struts 8 are made of such materials, for example metal, which possess sufficient flexibility whereby they will automatically adjust themselves to the varying bending moments caused by the changes of the level of the water within the pipe. In actual use these struts act like pure columns. The only eccentric loading which may be encountered is due to the wind pressure against the side of the pipe or misalignment of the foundations.

Though the reinforcing rings 3, the struts 8 and the elements 11 are described as being formed of channels, it is to be understood that this is not essential, since it is possible to use any of the various other structural shapes, such as I's and angles and combinations thereof with equal success.

While the support shown in the drawing is described as being securely anchored on a concrete pier, it may, if desired, be mounted on rollers or slide plates commonly used in construction work to compensate for expansion and contraction due to temperature changes.

In many places along the path of a pipe line it may be found advantageous to vary the length of the strut members to compensate for a change of level, thus making for economy of the material used for the foundations of the support, which is generally concrete. Furthermore, by the elimination of the concentrated stresses within the shell at the supports it will be possible to use a greatly increased spacing for the supports over the type previously used.

While this support has been described as being used on a large diameter pipe line, it is also suitable for large diameter fluid containers, such as tanks, which have approximately the same ratio of diameter with respect to thickness of shell as the pipe line described and have a length which is great in comparison with the diameter and having heads or ends which furnish little or no support to prevent deformation of the body of the tank from the original circular cross section. When such tanks are mounted on vehicles, such as railway cars, motor trucks and the like, this support reduces the stresses which may be induced in the tank by the weaving and vibration incident to the particular form of conveyance employed.

The support hereinbefore described is vastly superior to any supports employed prior to this invention. It successfully and effectively solves the difficulties encountered in pipe lines. It is simple and inexpensive. The behavior of the instant support was found to check the predicted mathematical behavior more closely than the 180° support.

Since it is obvious that various changes may be made in the above description without departing from the nature and spirit thereof, this invention is not restricted thereto except as set forth in the appended claims.

We claim:

1. In a pipe construction of the class described, a pipe having a reinforcing ring secured thereto, said reinforcing ring having a groove extending transversely of the pipe, a plurality of oppositely disposed supporting plates secured to said reinforcing ring within the groove thereof, and a support secured to each of said supporting plates.

2. In a pipe construction of the class described, a pipe having a reinforcing ring secured thereto, said reinforcing ring comprising flanged portions spaced apart to provide a groove therebetween, a plurality of oppositely disposed supporting plates secured to said reinforcing ring within the groove thereof, and a support secured to each of said supporting plates.

3. In a pipe construction of the class described, a pipe having a reinforcing ring secured thereto, a plurality of oppositey disposed supporting plates secured to said reinforcing ring along approximately 40° of arc thereof, and a support for said pipe secured to each of said supporting plates.

4. In a pipe construction of the class described, a pipe having a reinforcing ring secured thereto, a plurality of oppositely disposed supporting plates secured to said reinforcing ring along approximately 40° of arc thereof extending down from a horizontal diametrical line of the pipe, and a support for said pipe secured to each of said supporting plates.

5. In a pipe construction of the class described, a pipe having a reinforcing ring secured thereto, said reinforcing ring comprising channel sections spaced apart to provide a groove therebetween, a plurality of oppositely disposed supporting plates secured to said reinforcing ring within the groove thereof, and a support secured to each of said supporting plates.

6. In combination, a fluid container formed of a relatively thin shell adapted to be deformed in response to the forces acting thereon under the various loading conditions encountered, reinforcing rings about said shell at spaced intervals and supporting means for said shell comprising pairs of oppositely disposed columns adapted to exert pressure on said rings, said columns being inclined toward the vertical center line of said shell and being movable with said shell in response to deformations thereof at the various loading conditions, whereby a minimum of stress is induced in said shell by said supports.

7. In combination, a fluid container formed of a relatively thin shell and a plurality of oppositely disposed supports for said container, each of said supports being inclined at an angle of approximately 13.3° to the vertical and having a line of action through a point on the periphery of the container approximately 17.3° below the horizontal axis thereof.

8. In combination, a fluid container formed of a relatively thin shell, reinforcing rings about said container at spaced intervals, a plurality of oppositely disposed supports secured to said rings, said supports being inclined at an angle of approximately 13.3° to the vertical and having a line of action through a point on the periphery of the container approximately 17.3° below the horizontal axis thereof.

9. In combination, a large cylindrical fluid container formed of a relatively thin shell, reinforcing rings at intervals along the length of said container consisting of structural shapes attached to said container about its periphery and tending to maintain the circular cross-section of said container under various loading conditions, a plurality of supporting members for said container fixed to said reinforcing rings by gusset plates having a substantial area of contact with said rings, each of said supporting members being inclined at an angle of approximately 13.3° to the vertical and having a line of action through a point on the container approximately 17.3° below the horizontal center line thereof.

RICHARD L. TEMPLIN.
ROLLAND G. STURM.